United States Patent
Kamiyama et al.

(10) Patent No.: US 8,715,442 B2
(45) Date of Patent: May 6, 2014

(54) LATERAL PIPE LINING MATERIAL AND LATERAL PIPE LINING METHOD

(75) Inventors: Takao Kamiyama, Hiratsuka (JP); Koji Kaneta, Hiratsuka (JP); Kenji Fujii, Hiratsuka (JP); Fuminori Tanaka, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 109 days.

(21) Appl. No.: 12/930,940

(22) Filed: Jan. 20, 2011

(65) Prior Publication Data
US 2011/0186205 A1 Aug. 4, 2011

(30) Foreign Application Priority Data
Jan. 29, 2010 (JP) ................................. 2010-018331

(51) Int. Cl.
*B31F 5/04* (2006.01)

(52) U.S. Cl.
USPC ........... 156/204; 156/287; 156/196; 156/293; 138/98; 138/120

(58) Field of Classification Search
USPC ......... 156/204, 196, 311, 285, 293, 294, 287, 156/227, 211; 138/98, 120; 428/34.7, 35.4, 428/36.6
See application file for complete search history.

(56) References Cited

U.S. PATENT DOCUMENTS

| | | | | |
|---|---|---|---|---|
| 6,044,867 | A * | 4/2000 | Tweedie et al. | 138/98 |
| 6,539,978 | B1 * | 4/2003 | McGuire | 138/98 |
| 2006/0005893 | A1 * | 1/2006 | Kaneta et al. | 138/98 |
| 2008/0169036 | A1 * | 7/2008 | Kamiyama et al. | 138/98 |

* cited by examiner

*Primary Examiner* — Katarzyna Wyrozebski Lee
*Assistant Examiner* — Vishal I Patel
(74) *Attorney, Agent, or Firm* — Adams & Wilks

(57) ABSTRACT

A tubular lateral pipe lining material is configured to be inserted into a lateral pipe which intersects with a main pipe in order to repair the lateral pipe. The tubular lateral pipe lining material has a flexible tubular resin-absorbing material impregnated with an uncured curable liquid resin. The tubular resin-absorbing material has one end that is folded back. A flange member, over which the folded-back end of the tubular resin-absorbing material is pressed, is made of a thermoplastic resin. An adhesive is applied over the flange member and the folded-back end of the tubular-absorbing material to bond the tubular resin-absorbing material to the flange member.

20 Claims, 7 Drawing Sheets

1 …

LATERAL PIPE LINING MATERIAL AND LATERAL PIPE LINING METHOD

BACKGROUND OF THE INVENTION

1. Field of the Invention

The present invention relates to a lateral pipe lining material used for the rehabilitation of lateral pipes that branch from a main pipe, a lateral pipe lining material production method, and a lateral pipe lining method for rehabilitating lateral pipes using the lateral pipe lining material.

2. Description of the Related Art

When a lateral pipe that branches from a main pipe such as a water line or a sewage line that is buried in the earth wears out, methods are commonly used in which lateral pipes are repaired without excavating main pipes or lateral pipes (see JP 2006-123547A, for example).

With this method, a lateral pipe lining material having a flange at one end is installed inside a pressurization bag with the flange placed on the positioning nozzle of a work robot introduced into the main pipe. The work robot is driven to bring the flange of the lining into tight contact with the periphery of the lateral pipe opening of the main pipe. Compressed air is then supplied to the pressurization bag to insert the lateral pipe lining material into the lateral pipe towards the ground surface. The lateral pipe lining material is heated while being pressed onto the inner circumferential surface of the lateral pipe. After that, a thermosetting resin that is impregnated into the pipe lining material is cured. The lateral pipe is thus repaired by having its inner circumferential surface lined with the cured lateral pipe lining material.

This type of lateral pipe lining material is composed of a tubular flexible resin-absorbing material impregnated with a liquid curable resin, and the outer circumferential surface thereof (which becomes the inner circumferential surface when the pipe lining material is everted) is coated with a flexible tube composed of a plastic film that is highly impermeable to air. One end of the lateral pipe lining material is folded back, and the resin that is impregnated into the resin-absorbing material in this section is previously cured in the factory in order to provide a hard flange.

With this type of lateral pipe lining material, the tubular resin-absorbing material and flange are integrally formed, which is disadvantageous in that mass production is difficult. Therefore, JP 2000-37777A proposes a method for producing a lateral pipe lining material, in which the flange of the lateral pipe lining material and the resin-absorbing material thereof are produced separately and later bonded.

However, with the lateral pipe lining material of the type described in JP 2000-37777A, the end of the tubular resin-absorbing material is pressed outwards and widened on the flange of the lateral pipe lining material, and an additional flange is used to press the widened end of the tubular resin-absorbing material against the flange of the lateral liner for fixture therebetween. A problem is thus presented in that certain skill is required for fixing the flange members to the tubular resin-absorbing material, and also two flange members are disadvantageously required.

SUMMARY OF THE INVENTION

It is therefore an object of the present invention to provide a lateral pipe lining material that can be produced by a simple method, a lateral pipe lining material production method, and a lateral pipe lining method for rehabilitating lateral pipes using the lateral pipe lining material.

According to the present invention, a tubular lateral pipe lining material is inserted into a lateral pipe which intersects with a main pipe in order to repair the lateral pipe. The tubular lateral pipe lining material comprises a flexible tubular resin-absorbing material impregnated with an uncured curable liquid resin, whose one end is folded back; a flange member over which the folded-back end of the tubular resin-absorbing material is pressed out; and an adhesive that is applied over the flange member and the folded-back end of the tubular-absorbing material to bond the tubular resin-absorbing material to the flange member.

The present invention further provides a method for producing a tubular lateral pipe lining material inserted into a lateral pipe that intersects with a main pipe in order to repair the lateral pipe. The lateral pipe lining material includes a flexible tubular resin-absorbing material impregnated with an uncured curable liquid resin. The method comprises producing a flange member that is to be joined to the tubular resin-absorbing material; folding back one end of the tubular resin-absorbing material not yet impregnated with the curable resin, and pressing out the folded-back end thereof over the flange member; applying an adhesive over the flange member and the folded-back end of the tubular resin-absorbing material to bond the tubular resin-absorbing material to the flange member; and impregnating the tubular resin-absorbing material with the uncured liquid curable resin.

The present invention further provides a lateral pipe lining method for rehabilitating an inner circumferential surface of a lateral pipe that intersects with a main pipe using the lateral pipe lining material as described above. The method comprises transporting the lateral pipe lining material into the main pipe; bringing the flange member of the lateral pipe lining material into close contact with the periphery of lateral pipe opening of the main pipe; inserting the tubular resin-absorbing material into the lateral pipe; pressing the tubular resin-absorbing material against the inner circumferential surface of the lateral pipe; and curing the resin impregnated into the tubular resin-absorbing material.

According to the present invention, a lateral pipe lining material is produced by pressing out the folded-back end of a tubular resin-absorbing material over a flange part of a flange member, and applying an adhesive over the folded-back end of the tubular resin-absorbing material and the flange member to bond the tubular resin-absorbing material to the flange member. Consequently, a lateral pipe lining material in which the tubular resin-absorbing material and the flange member are firmly bonded can be readily produced using few members. Moreover, the lateral pipe lining method that utilizes this type of lateral pipe lining material can be simplified and reduced in cost.

Further features of the invention, its nature and various advantages will be more apparent from the accompanying drawings and following detailed description of the invention.

DETAILED DESCRIPTION OF THE INVENTION

The present invention will now be described in detail with reference to the embodiments shown in the attached drawings.

Figure 1:
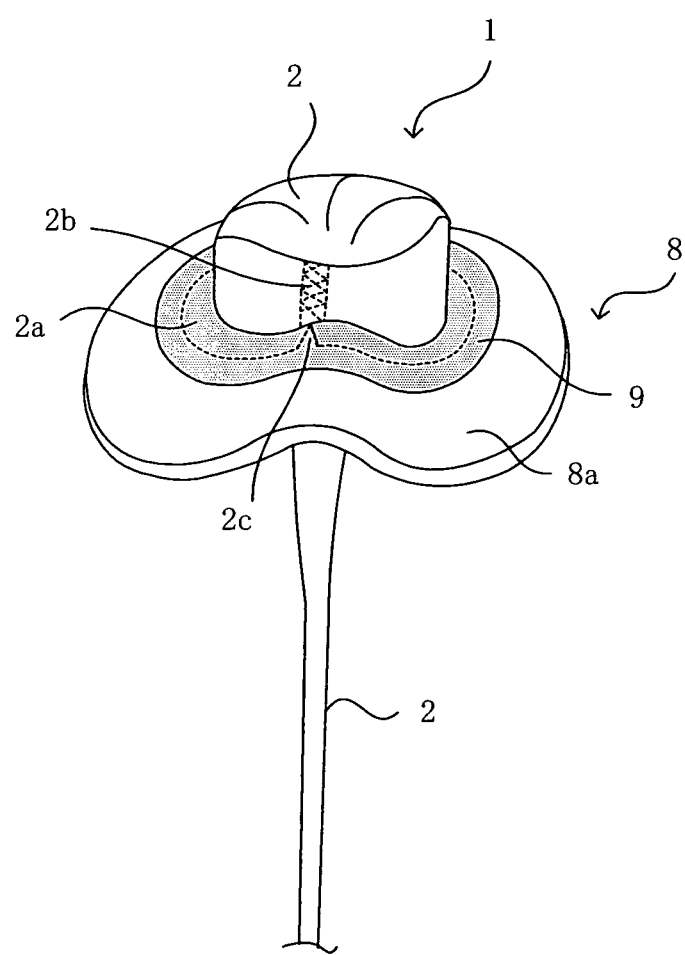
FIG. 1 is a perspective view showing the external appearance of a lateral pipe lining material of the present invention.
Figure 2:
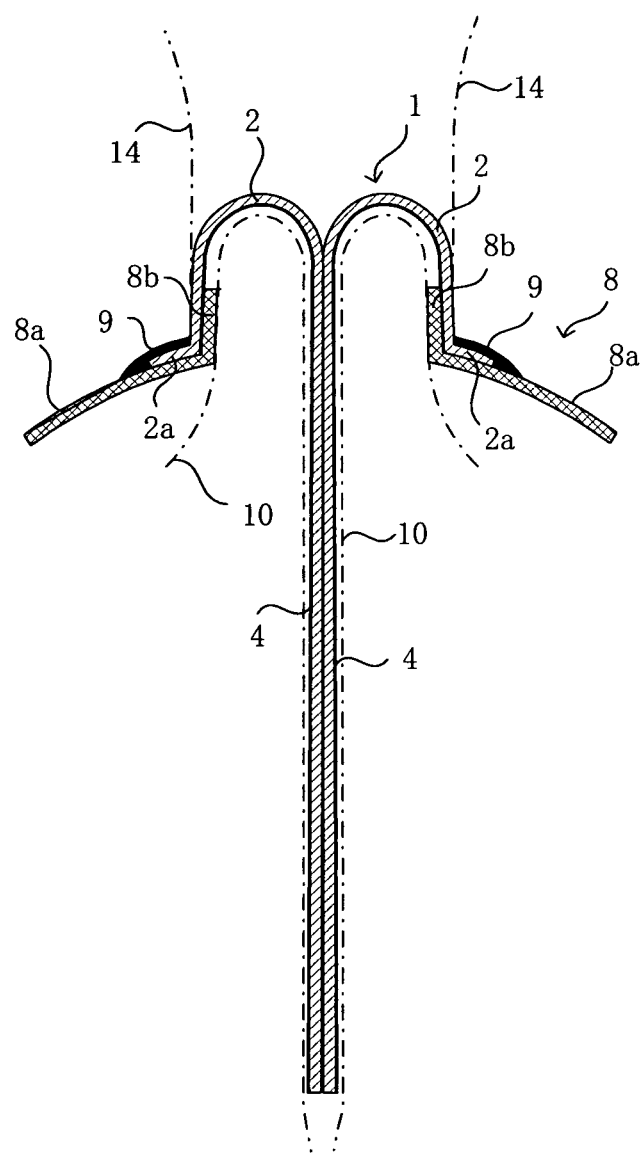
FIG. 2 is a sectional view of the lateral pipe lining material shown in FIG. 1.

FIG. 1 is a perspective view of a lateral pipe lining material according to the present invention, and FIG. 2 is a sectional view thereof. In FIGS. 1 and 2, a tubular lateral pipe lining material 1 includes a flexible tubular resin-absorbing material 2 composed of a nonwoven cloth made of polyester, polypropylene, nylon, acrylic, and vinylon. An air-impermeable plastic film 4 made of polyurethane, polyethylene, polyethylene/nylon copolymer, vinyl chloride, or the like is thermally fused and bonded to the outer circumferential surface of the flexible tubular resin-absorbing material 2 in order to air-tightly cover the entire surface of the resin-absorbing material 2.

The tubular resin-absorbing material 2 is impregnated with an uncured liquid thermosetting resin such as an unsaturated polyester resin, a vinyl ester resin, or an epoxy resin. The tubular resin-absorbing material 2 may be impregnated with a photo-curing resin that cures under irradiation with ultraviolet light, with instead of or together with the thermosetting resin.

The tubular resin-absorbing material 2 has one end 2a folded back outwards and is joined to a flange member 8 comprising a flange part 8a and a cylindrical part 8b that is integrally formed therewith and extends upwards from the flange part 8a towards the lateral pipe. The flange part 8a of the flange member 8 has its surface curved arcuately with a curvature corresponding to the inner surface of the main pipe described below and has an outside diameter that is larger than the inside diameter of the lateral pipe that intersects with the main pipe. The outside diameter of the cylindrical part 8b is the same as, or slightly smaller than, the inside diameter of the folded-back circular portion of the tubular resin-absorbing material 2, so that it can fit along the outer circumferential surface of the cylindrical part 8b of the flange member 8.

The flange member 8 is mass-produced separately from the tubular resin-absorbing material 2 by a plastic injection molding method (injection molding method) or other plastic molding method using a thermoplastic resin such as vinyl chloride or a material produced by adding inorganic filler thereto.

The flange member 8 is bonded to the tubular resin-absorbing material 2 as described below.

One end of the tubular resin-absorbing material 2 that has not yet been impregnated with curable resin is folded back outwards (denoted at 2a) and everted, and the folded-back portion is expanded into a circular shape and fitted onto the cylindrical part 8b of the flange member 8. The tubular resin-absorbing material 2 is flexible and thus tightly covers the outer circumferential surface of the cylindrical part 8b of the flange member 8 and also fits therein so that the distal end part, i.e. the folded-back end 2a of the tubular resin-absorbing material 2 is pressed outwards and extends over the flange part 8a. The tubular resin absorbing material 2 is produced by sewing a flat nonwoven cloth into a cylinder, and when the tubular resin-absorbing material is fitted onto the cylindrical part of the flange member, the sewn part 2b (FIG. 1) is broken, facilitating pressing out onto the flange part 8a. If breaking is difficult, a notch may be provided previously at one location or in multiple locations of the folded-back end 2a of the tubular resin-absorbing material 2 along the extended direction (lengthwise direction) thereof. When the folded back end 2a is pressed outwards, the notch widens in the shape of a V and forms a cut part 2c.

An adhesive 9 is applied across the folded-back end 2a of the pressed-out lateral pipe lining material 2 and the flange part 8a of the flange member 8 in the state where the folded-back portion of the tubular resin-absorbing material 2 is fitted onto the cylindrical part 8b of the flange member 8 and the folded-back end 2a of the tubular resin-absorbing material is pressed out over the flange part 8a. The adhesive 9 allows the tubular resin-absorbing member 2 to adhere securely to the flange member 8. An epoxy resin or another thermosetting resin, for example, may be used as the adhesive 9.

The portion of the tubular resin-absorbing material 2 that is not folded back is placed in a flat state.

After the tubular resin-absorbing material 2 and the flange member 8 have been caused to adhere securely together using the adhesive 9, the tubular resin-absorbing material 2 is impregnated with an uncured liquid thermosetting resin and/or photo-curing resin. Resin impregnation can be carried out using a well-known method. For example, a flexible tube 14 of plastic film is attached to the turned-back portion of the tubular resin-absorbing material 2, as shown by dotted lines in FIG. 2, and the resin is charged from above into the tube 14. The tube 14 is then everted inward using compressed air or the like into the tubular resin-absorbing material 2 for resin impregnation therein.

This type of lateral pipe lining material is produced by fitting the folded-back end 2a of the tubular resin-absorbing material 2 onto the cylindrical part 8b of the flange member 8, pressing out the folded-back end 2a over the flange part 8a of the flange member 8, and applying the adhesive 9 to the pressed-out portion and the flange part 8a to fix together the tubular resin-absorbing material 2 and the flange member 8.

A sealing tube 10, as shown by dotted lines in FIG. 2, is used for everting and inserting the lateral pipe lining material into the lateral pipe. The sealing tube 10, also referred to as an in-liner or inflater (expansion bag), is attached to a pressurization bag as described below.

A method for rehabilitating lateral pipes using the lateral pipe lining material thus produced is described below.

Figure 3:
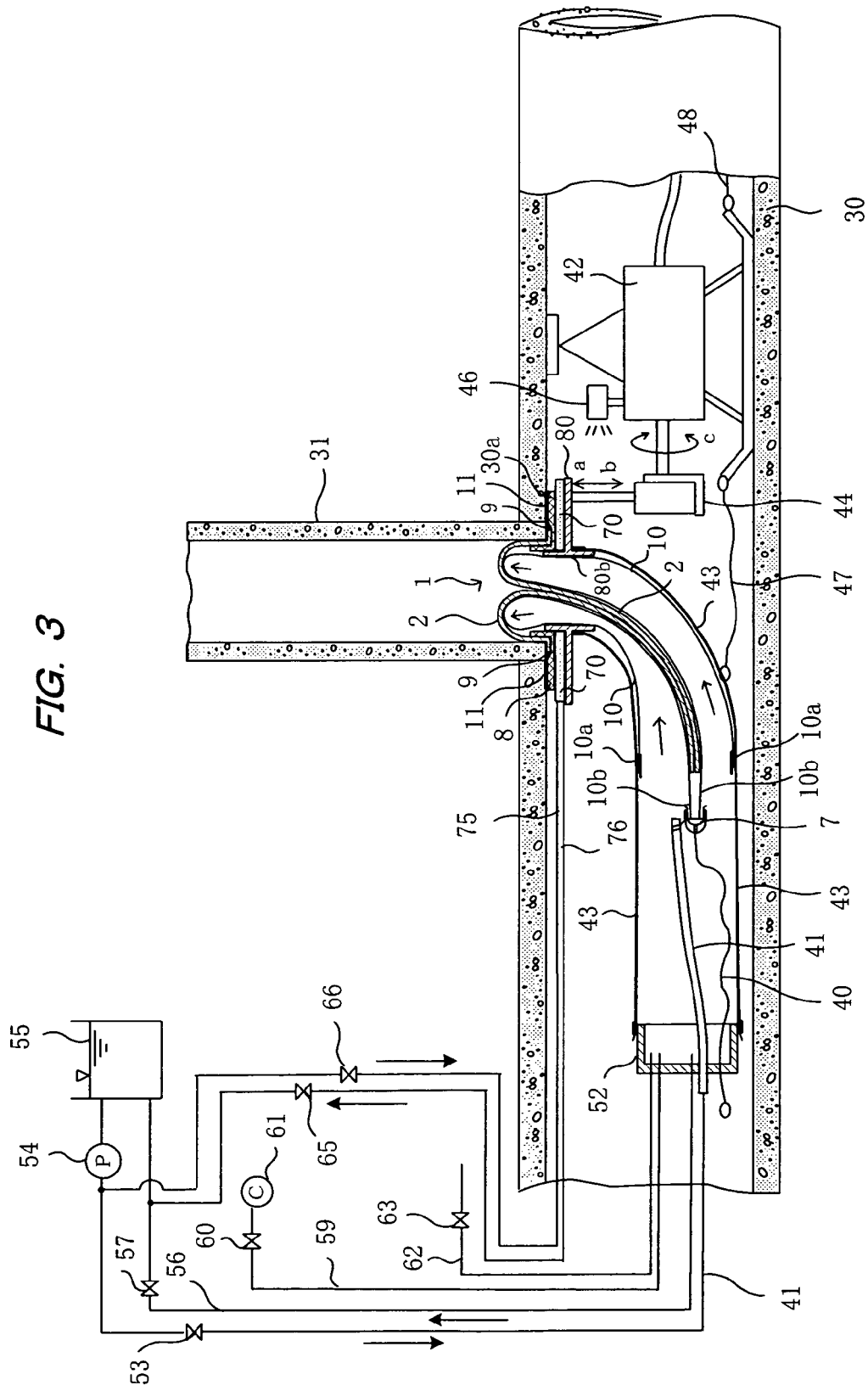
FIG. 3 is an illustrative view showing a method for rehabilitating a lateral pipe using the lateral pipe lining material of the present invention, wherein the lateral pipe lining material is transported into the lateral pipe opening of the main pipe.

As shown in FIG. 3, a work robot 42 transported into the main pipe has a head 44. Attached to the head 44 of the work robot 42 is a head collar 80 that is hermetically fixed to one end of a pressurization bag 43. The lateral pipe lining material 1 is housed inside the pressurization bag 43, and the flange 8 thereof is attached to the head collar 80 via a ring-shaped flange-pressing tool 70 in the form of an air bladder. A thermosetting adhesive 11 such as an epoxy resin is applied to the entire upper part of the flange part 8a of the flange member 8.

The work robot 42 is driven so that the head 44 rises and falls in the directions a, b in FIG. 3 and rotates (rolls) about the pipe axis as indicated by the arrow c. A monitoring TV camera 46 is provided in the upper part of the work robot 42. Tow ropes 47, 48 are attached to the front and back of the work robot 42, and one of the tow ropes 47 is connected to the pressurization bag 43, and the other of the tow ropes 48 runs above ground. By pulling on the tow rope 48, the pressurization bag 43 is transported via the work robot 42 and the tow rope 47 to the location of the lateral pipe 31 that intersects with the main pipe 30.

A cap 52 seals the open end of the pressurization bag 43. The sealing tube 10 housed in the pressurization bag 43 has one end 10a hermetically fixed to the pressurization bag 43 and the other end 10b hermetically attached to a connector 7. A hot water hose 41 and a tow rope 40 hermetically attached to the cap 52 are connected to the connector 7. The hot water hose 41 exits from the pressurization bag 43 through the cap 52 and communicates with a valve 53. Hot water (heating medium) is supplied by a hot water pump 54 to the hot water hose 41 from a hot water tank 55 that is heated by a heat source (not shown). The hot water in the pressurization bag 43 is returned to the hot water tank 55 via a discharge hose 56 and a valve 57.

Hot water is also supplied to a heating medium supply hose 75 attached to the flange pressing tool 70 from the hot water tank 55 via the hot water pump 54 and a valve 66. The hot water in the flange pressing tool 70 is returned to the hot water tank 55 via a heating medium discharge hose 76 and a valve 65.

An air-tightly sealed space is formed in the pressurization bag 43 by the sealing tube 10. The sealed space communicates with a compressor 61 on the ground via a valve 60 and an air hose 59 attached to the cap 52, and also communicates with the external atmosphere via an exhaust hose 62 and a valve 63.

Pulling on the tow rope 48 moves the pressurization bag 43 until the center of the cylindrical part 80b of the head collar 80 falls into substantial alignment with the axial center of the lateral pipe 31.

The head 44 of the work robot 42 is moved upwards in the direction of arrow a to bring the flange member 8 of the lateral pipe lining material 1 into close contact with the lateral pipe opening periphery 30a of the main pipe 30 via the flange pressing tool 70. The hot water from the hot water tank 55 is supplied to the flange pressing tool 70 via the heating medium supply hose 75, causing the flange pressing tool 70 to expand. The thermoplastic flange member 8 is softened by the hot water and made flexible, thus allowing the flange member 8 to come into close contact with the lateral pipe opening periphery 30a of the main pipe 30. The hot water that is supplied from the hot water tank to the flange pressing tool 70 is of a temperature at which the flange member 8 softens to become flexible. The temperature is set, for example, at a temperature of about 60 to 90° C.

The flange member 8 is heated by the hot water, the adhesive 11 that has been applied to the flange member 8 begins to cure, and the flange member 8 is fixed tightly to the lateral pipe opening periphery 30a of the main pipe 30.

In conjunction with the affixing of the flange member to the lateral pipe opening periphery, the compressor 61 is driven to supply compressed air (pressurization medium) to the sealed space in the pressurization bag 43 via the air hose 59. As the sealing tube 10 expands, it is everted and inserted into the lateral pipe. The lateral pipe lining material 1 that is enclosed in the sealing tube 10 is also successively inserted upwards into the lateral pipe 31 while being everted. At this time, the tow rope 40 and the hot water hose 41 connected to the sealing tube 10 via the connection tool 7 are also inserted into the lateral pipe 31.

Figure 4:
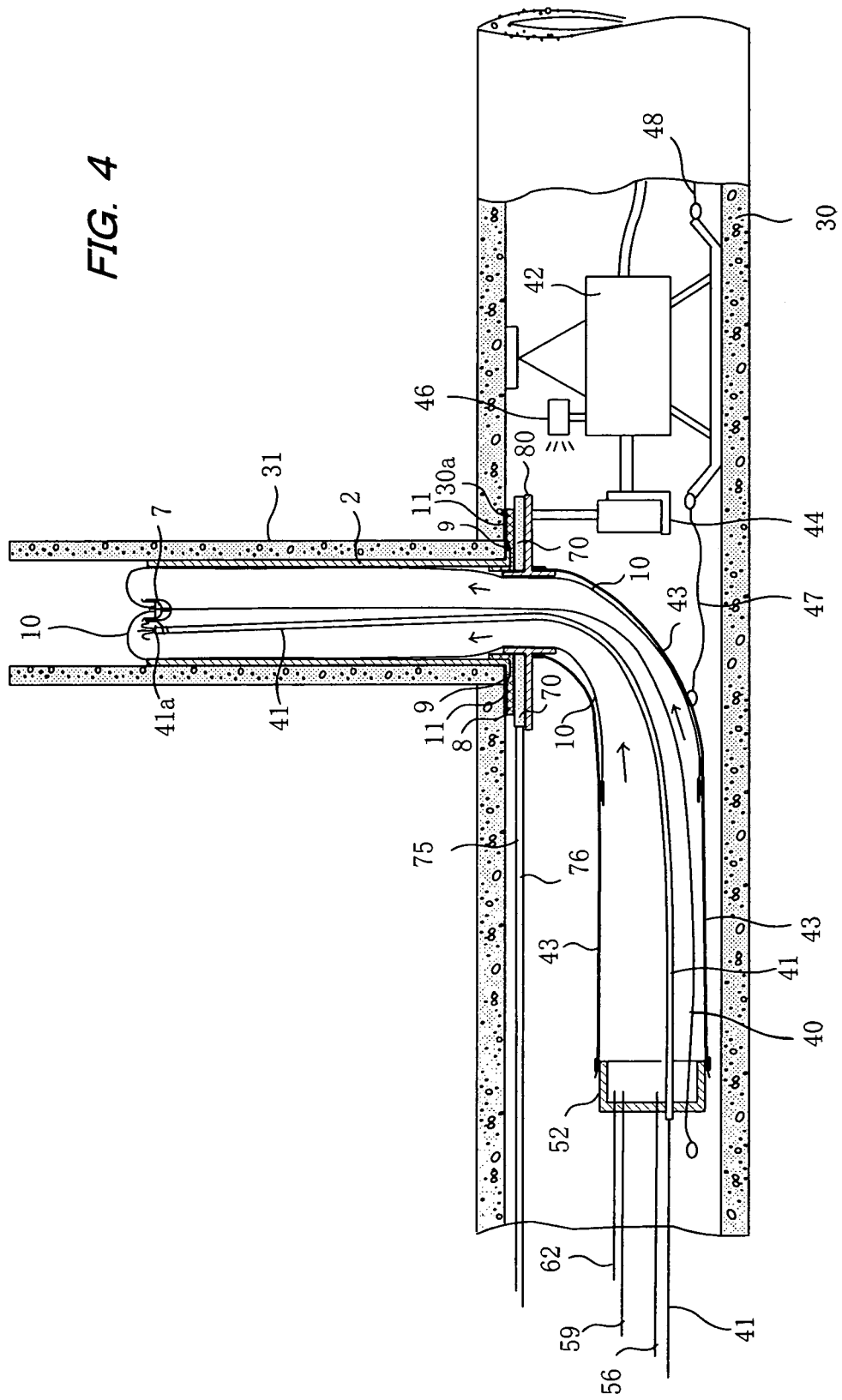
FIG. 4 is an illustrative view showing a method for rehabilitating a lateral pipe using the lateral pipe lining material of the present invention, wherein the lateral pipe lining material is everted and inserted into the lateral pipe.

As shown in FIG. 4, when eversion and insertion of the lateral pipe lining material 1 into the lateral pipe 31 have been completed, the lateral pipe lining material 1 is pressed onto the inner circumferential surface of the lateral pipe 31. Hot water is then supplied from the distal end 41a of the hot water hose 41 and fills the interior of the sealed space therewith. The compressed air in the sealed space is discharged into the atmosphere via the exhaust hose 62, whereas the thermosetting resin that is impregnated into the tubular resin-absorbing material 2 of the lateral pipe lining material 1 is heated and cured by the hot water that is supplied from the hot water tank 55. During this time, the adhesive 11 that is applied to the flange member 8 is also heated by the hot water and continues to cure.

After the adhesive 11 applied to the flange member 8 and the resin impregnated into the tubular resin-absorbing material 2 have been cured, the hot water is extracted from the sealed space via the discharge hose 56 and is returned to the hot water tank 55. The hot water in the flange pressing tool 70 is also returned to the hot water tank via the heating medium discharge hose 76.

Figure 5:
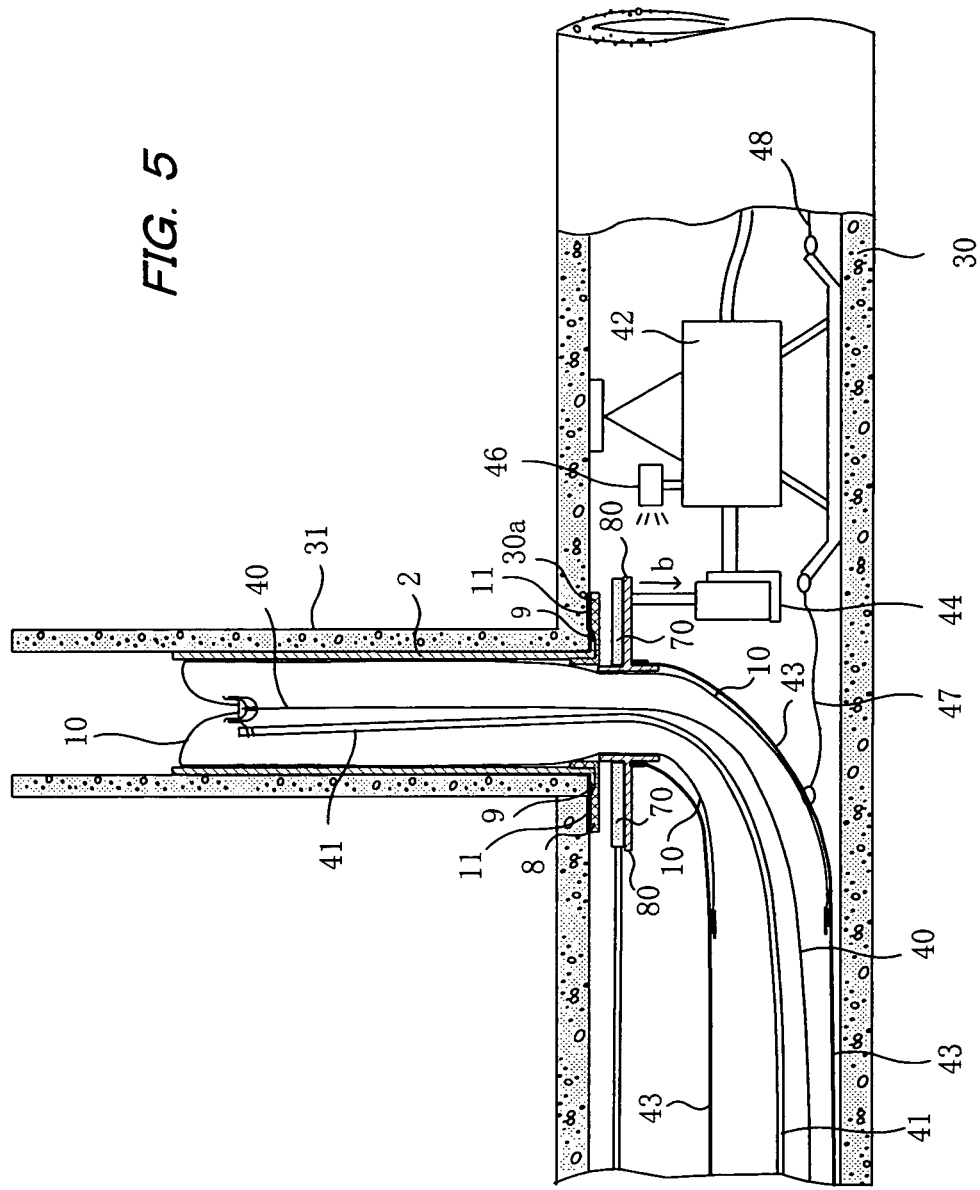
FIG. 5 is an illustrative view showing a method for rehabilitating a lateral pipe using the lateral pipe lining material of the present invention, wherein the lateral pipe lining material is pressed against the inner periphery of the lateral pipe and cured by heating.

After the hot water is returned to the hot water tank 55, the tow rope 40 and hot water hose 41 are pulled to the left in FIG. 5 with pressurization maintained to a degree in the sealed space in order to evert the sealing tube 10 and remove it from the lateral pipe lining material 1.

Next, the head 44 of the work robot 42 is moved downwards in the direction of the arrow b, and the flange pressing tool 70 is separated from the flange member 8 of the lateral pipe lining material 1. The work robot 42, the pressurization bag 43, and the like are removed from the main pipe 30. The internal circumferential surface of the lateral pipe 31 is thus lined with the tubular resin-absorbing material 2.

In the embodiment described above, the flange pressing tool 70 is expanded by supplying hot water to the flange pressing tool 70, thereby bringing the flange member 8 into close contact with the lateral pipe opening periphery 30a of the main pipe 30. The adhesive 11 is cured by the hot water in the flange pressing tool 70, and the lateral pipe lining material 1 is subsequently inserted into the lateral pipe 31. However, when the lateral pipe lining material 1 is inserted into the lateral pipe 31, or when the curable resin that has been impregnated into the tubular resin-absorbing material 2 is cured after the insertion, or after initiation of curing, the flange pressing tool 70 may be expanded to bring the flange member 8 into close contact with the lateral pipe opening periphery 30a of the main pipe 30, and the adhesive 11 may be cured by the hot water that is supplied from the hot water hose 41.

The hot water that is supplied from the hot water hose 41 and the heating medium that expands the flange pressing tool 70 and heats the adhesive 11 on the flange member 8 may be hot air or a heated fluid (e.g., water vapor or oil), rather than the hot water described above. When another heating medium is used, a heat source and a circulation system for circulating the heating medium are thus accordingly provided.

In FIG. 4, the resin of the tubular resin-absorbing material 2 has been cured by supplying hot water from the distal end of the hot water hose 41, but the resin of the tubular resin-absorbing material 2 may also be cured by providing a plurality of spray holes on the hot water hose 41 and spraying hot water or water vapor from the spray holes onto the lateral pipe lining material 2 in the form of a shower or mist.

Figure 6:
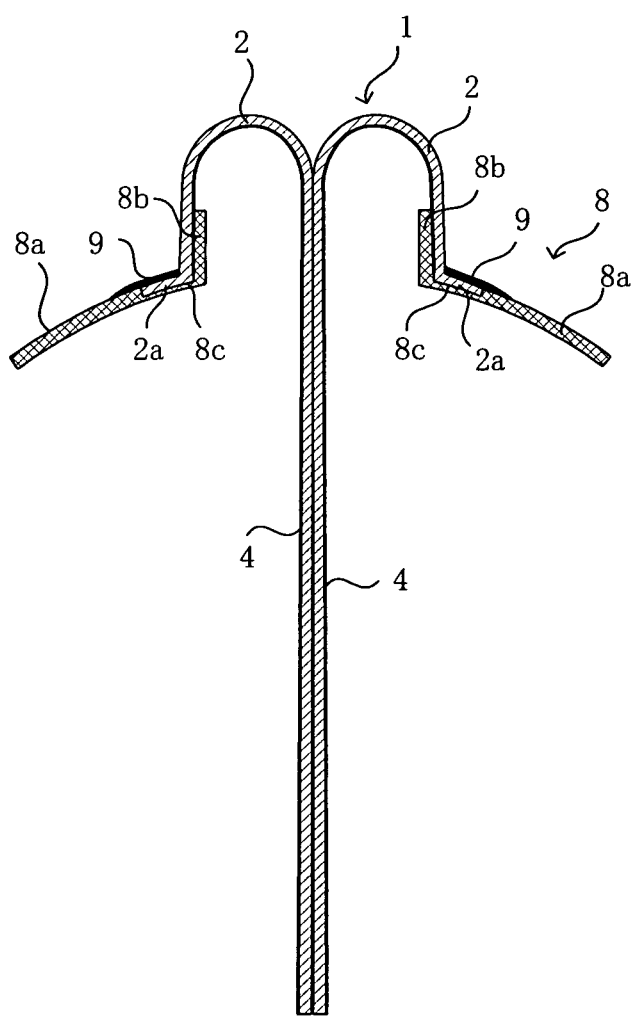
FIG. 6 is a vertical sectional view showing another embodiment of the lateral pipe lining material.

With the lateral pipe lining material shown in FIG. 6, an annular recess part 8c is formed in the attachment base portion of the flange part 8a of the flange member 8, and the folded-back end 2a of the tubular resin-absorbing material 2 fits into the recess part 8c. The depth of the recess part 8c preferably is set at a depth whereby the surface of the folded-back end 2a that is pressed out is on the same plane as the surface of the flange part 8a. With this type of lateral pipe lining material 1, even though the adhesive 9 is applied across the flange part 8a and the folded-back end 2a of the tubular resin-absorbing material 2, the surfaces of the flange part 8a and the folded-back end 2a are on approximately the same plane, enhancing tight affixing of the flange member 8 to the lateral pipe opening periphery 30a.

Figure 7:
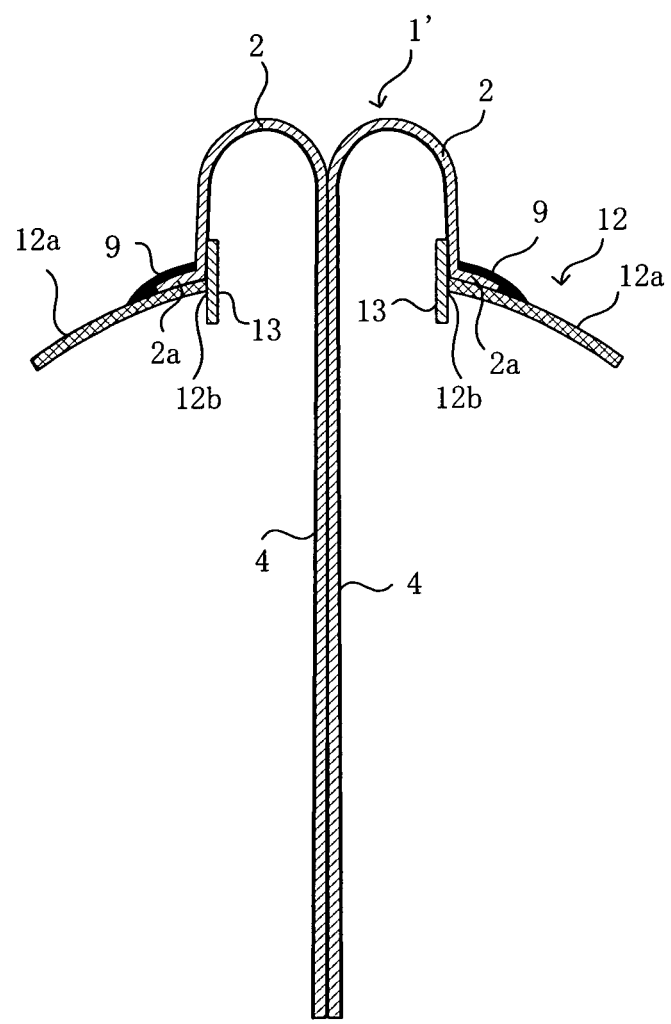
FIG. 7 is a vertical sectional view showing still another embodiment of the lateral pipe lining material.

FIG. 7 shows another embodiment of the lateral pipe lining material. In FIG. 7, the same symbols are assigned to the same members as in FIGS. 1 and 2, and detailed descriptions are omitted. In FIG. 7, the sealing tube 10 and the resin introducing tube 14 and that were indicated by dotted lines in FIG. 2 are not shown.

In FIG. 7, a flange member 12 having a circular hole 12b formed in the middle thereof is provided for the lateral pipe lining material 1'. The external part (circumferential area) of the hole 12b constitutes the flange part 12a (corresponding to the flange part 8a of the lateral pipe lining material 1 in FIGS. 1 and 2). A provisional cylindrical member 13 is fitted into the circular hole 12b of the flange member 12, providing the function of the cylindrical part 8b of the flange member 8 shown in FIG. 2.

With the lateral pipe lining material 1' of FIG. 7 as well, the tubular resin-absorbing material 2 and the flange member 12 are bonded in the same manner as the lateral pipe lining material 1 in FIGS. 1 and 2. Specifically, one end of the tubular resin-absorbing material 2 that is not yet impregnated with curable resin is folded back outwards and everted, and the folded back part is expanded into a circle and fitted onto the provisional cylindrical member 13. The folded-back end 2a of the tubular resin-absorbing material 2 is pressed out on the flange part 12a. Subsequently, an adhesive 9 is applied over the flange part 12a of the flange member 12 and the folded-back end 2a of the tubular resin-absorbing material 2. When the tubular resin-absorbing material 2 and the flange member 12 are bonded, the provisional cylindrical member 13 is removed from the flange member 12. Using a similar method, uncured thermosetting resin and/or photo-curing resin are impregnated in liquid form into the tubular resin-absorbing material 2.

With this type of lateral pipe lining material 1', it is not necessary to form a cylindrical part on the flange member, and thus the lateral pipe lining material can be produced inexpensively. With the lateral pipe lining material 1' produced in this manner, the inner circumferential surface of a lateral pipe can be lined by the method as shown in FIGS. 3 to 5.

As with the lateral pipe lining material shown in FIG. 6, the lateral pipe lining material 1' may have a ring-shaped recess in the attachment base portion of the flange part 12a, so that the folded-back end 2a of the pressed-out tubular resin-absorbing material 2 fits into the recess. The depth of the recess formed in the flange part 12a is preferably set at a depth whereby the surface of the folded-back end 2a that is pressed out is coplanar with the surface of the flange part 12a.

What is claimed is:

1. A tubular lateral pipe lining material that is inserted into a lateral pipe which intersects with a main pipe in order to repair the lateral pipe, comprising:
    a flexible tubular resin-absorbing material having one end that is folded back;
    a flange member over which the folded-back end of the tubular resin-absorbing material is pressed, the flange member consisting of a thermoplastic resin;
    an adhesive that is applied over the flange member and the folded-back end of the tubular-absorbing material to bond the tubular resin-absorbing material to the flange member; and
    one of an uncured liquid thermosetting resin and a photo-curing resin that is different from the adhesive and that is impregnated in the tubular resin-absorbing material bonded to the flange member.

2. A lateral pipe lining material according to claim 1, wherein the flange member comprises a flange part having a curved surface with a curvature corresponding to that of an inner surface of the main pipe, and a cylindrical part that extends from the flange part, the folded-back end of the tubular resin-absorbing material being fitted onto the cylindrical part of the flange member and pressed out over the flange part of the flange member.

3. A lateral pipe lining material according to claim 1, wherein the flange member has a circular hole in a center part thereof to form a flange part over which the folded-back end of the tubular resin-absorbing material is pressed out.

4. A lateral pipe lining material according to claim 1, wherein the flange member has an annular recess into which the folded-back end of the tubular resin absorbing material is fitted.

5. A method for rehabilitating an inner circumferential surface of a lateral pipe that intersects with a main pipe using the lateral pipe lining material according to claim 1, comprising:
    transporting the lateral pipe lining material into the main pipe;
    bringing the flange member of the lateral pipe lining material into close contact with a periphery of a lateral pipe opening of the main pipe;
    inserting the tubular resin-absorbing material of the lateral pipe lining material into the lateral pipe;
    pressing the tubular resin-absorbing material against an inner circumferential surface of the lateral pipe; and
    curing the resin impregnated into the tubular resin-absorbing material.

6. A lateral pipe lining method according to claim 5, wherein the flange member of the lateral pipe lining material has at a center thereof a recess into which the folded-back end of the tubular resin-absorbing material is fitted.

7. A lateral pipe lining method according to claim 5, wherein the flange member of the lateral pipe lining material is brought into close contact with the periphery of the lateral pipe opening of the main pipe via a flange pressing tool that can be expanded by supplying a heating medium.

8. A lateral pipe lining method according to claim 5, further comprising applying a thermosetting adhesive to the flange member.

9. A lateral pipe lining method according to claim 8, further comprising curing the thermosetting adhesive by supplying a heating medium to a flange pressing tool.

10. A tubular lateral pipe lining material according to claim 1, wherein the liquid resin impregnated in the flexible tubular resin-absorbing material comprises an uncured liquid thermosetting resin.

11. A tubular lateral pipe lining material according to claim 1, further comprising an air-impermeable plastic film bonded to an outer circumferential surface of the tubular resin-absorbing material.

12. A tubular lateral pipe lining material according to claim 1, wherein the flexible tubular resin-absorbing material is further impregnated with a photo-curing resin.

13. A tubular lateral pipe lining material according to claim 1, wherein the flange member has a unitary construction with a flange part and a cylindrical part extending from the flange part, the folded-back end of the tubular resin-absorbing material being fitted on the cylindrical part of the flange member and being pressed on the flange part of the flange member.

14. A tubular lateral pipe lining material according to claim 5, wherein the liquid resin impregnated in the flexible tubular resin-absorbing material of the lateral pipe lining material comprises an uncured liquid thermosetting resin.

15. A tubular lateral pipe lining material for repairing a pipe, the tubular lateral pipe lining material comprising:
a flexible tubular resin-absorbing material having a folded-back end;
a single flange member having an outer circumferential surface along which the folded-back portion of the tubular resin-absorbing material is fitted, the single flange member consisting of a thermoplastic resin;
an adhesive applied over the single flange member and the folded-back portion of the tubular resin-absorbing material to bond the tubular resin-absorbing material to the outer circumferential surface of the single flange member; and
one of an uncured liquid thermosetting resin and a photo-curing resin that is different from the adhesive and that is impregnated in the tubular resin-absorbing material bonded to the outer circumferential surface of the single flange member.

16. A tubular lateral pipe lining material according to claim 15, wherein the single flange member has a flange part and a cylindrical part extending from and integral with the flange part, the folded-back end of the tubular resin-absorbing material being fitted on the cylindrical part of the single flange member and being pressed on the flange part of the single flange member.

17. A tubular lateral pipe lining material according to claim 15, wherein the liquid resin impregnated in the flexible tubular resin-absorbing material comprises an uncured liquid thermosetting resin.

18. A method for rehabilitating an inner circumferential surface of a lateral pipe that intersects with a main pipe, comprising:
transporting the lateral pipe lining material according to claim 15 into the main pipe;
bringing the flange member of the lateral pipe lining material into close contact with a periphery of a lateral pipe opening of the main pipe;
inserting the tubular resin-absorbing material of the lateral pipe lining material into the lateral pipe;
pressing the tubular resin-absorbing material against an inner circumferential surface of the lateral pipe; and
curing the resin impregnated into the tubular resin-absorbing material.

19. A lateral pipe lining method according to claim 18, wherein the liquid resin impregnated in the flexible tubular resin-absorbing material of the lateral pipe lining material comprises an uncured liquid thermosetting resin.

20. A lateral pipe lining method according to claim 18, wherein the single flange member of the lateral pipe lining material has a flange part and a cylindrical part extending from and integral with the flange part, the folded-back end of the tubular resin-absorbing material of the lateral pipe lining material being fitted on the cylindrical part of the single flange member and being pressed on the flange part of the single flange member.

* * * * *